US005097195A

United States Patent [19]

Raad et al.

[11] Patent Number: 5,097,195

[45] Date of Patent: Mar. 17, 1992

[54] AC EXCITER FOR VSCF STARTER/GENERATOR

[75] Inventors: Bernard A. Raad, Fair Haven, N.J.; Barry J. Parker, Rockford, Ill.; Alexander Krinickas, Rockford, Ill.; Loren Rademacher, Rockford, Ill.; Alexander Cook, Rockford, Ill.

[73] Assignee: Sundstrand Corporation, Rockford, Ill.

[21] Appl. No.: 441,566

[22] Filed: Nov. 27, 1989

[51] Int. Cl.$^{5}$ .......................... F02N 11/08; H02P 9/04

[52] U.S. Cl. .................................... 322/10; 290/38 R; 290/46

[58] Field of Search ........................ 322/10, 11, 29, 32, 322/61; 290/38 R, 46

[56] References Cited

U.S. PATENT DOCUMENTS

| | | | |
|---|---|---|---|
| 3,809,914 | 5/1974 | Kilgore | 290/38 R |
| 3,908,161 | 9/1975 | Messenger | 322/29 |
| 4,467,267 | 8/1984 | Hucker et al. | 322/61 |
| 4,743,777 | 5/1988 | Shilling et al. | 290/46 |
| 4,786,852 | 11/1988 | Cook | 322/10 |
| 4,947,100 | 8/1990 | Dyanchand et al. | 322/10 |
| 4,948,209 | 8/1990 | Baker et al. | 322/10 |
| 4,968,926 | 11/1990 | Dyanchand | 322/10 |
| 4,992,721 | 2/1991 | Latos | 322/10 |

*Primary Examiner*—R. J. Hickey

*Attorney, Agent, or Firm*—Wood, Phillips, Mason, Recktenwald & VanSanten

[57] ABSTRACT

The problem of providing field power to a stationary main generator field winding (22) is addressed such that it can be used as a motor. A dynamoelectric machine (12) is operated as both a generator and a motor. An AC-AC exciter (14) is controlled by an exciter inverter (42) to operate as an exciter generator in a generate mode, and as a rotary transformer in a start mode. The exciter inverter (42) supplies low frequency power to an exciter field winding (28) in a generate mode of operation, and supplies high frequency AC power to the generator field winding (28) in the start mode of operation.

10 Claims, 2 Drawing Sheets

AC EXCITER FOR VSCF STARTER/GENERATOR

FIELD OF THE INVENTION

This invention relates to electrical power systems and, more particularly, to an AC exciter for use in connection with a variable speed constant frequency starting and generating system.

BACKGROUND OF THE INVENTION

Conventional electrical power systems utilize a synchronous electrical generator for generating AC power. Particularly, such a generator may include a rotor and a stator having a stator coil. In applications such as to an aircraft, the rotor is driven by an engine so that electrical power is developed in the stator coil. Owing to the variation in engine speed, the frequency of the power developed in the generator windings is similarly varying. This varying frequency power is converted to constant frequency power in a variable speed constant frequency (VSCF) system including a power converter which may develop, for example, $115/200V_{ac}$ power at 400 Hz. Such known converters are controlled by a generator/converter control unit (GCCU).

In order to provide aircraft engine starting, such known power systems have operated the generator as a motor. Specifically, an external power source is coupled through a start control to the generator to energize the stator coil and thus develop motive power to rotate the engine and thus start it. The components required in such a start control increase the weight of the aircraft and take up valuable space. To minimize the size and weight of such added start controls, certain known aircraft VSCF power systems have utilized the existing converter and GCCU both for the start and the generate functions.

VSCF generators typically include a permanent magnet generator which is coupled through a regulator to a DC winding of an exciter. The exciter includes an armature winding which typically develops polyphase AC power which is rectified and supplied to the DC field of the main generator. However, because the exciter uses rotation to transform mechanical power into electrical power, the excitation for the wound field main generator cannot be supplied at zero speed. A rotary transformer, having a secondary winding rotating with the common shaft, can be used to provide excitation for the wound main generator field even at standstill. A rotating transformer would utilize high frequency AC power, supplied by an external source, to energize its stationary winding, which would induce an AC current in its secondary winding. This AC coupled power could then be rectified, as above, to provide the DC field power to the immobilized main generator field winding. Such a rotating transformer configuration would require the use of an additional device in the power system attached to the common shaft. The use of an additional rotating transformer for starting the engines would not only increase the weight of the aircraft, but also unduly occupy valuable space, and require additional cost.

One approach for overcoming these problems is disclosed in Shilling et al. U.S. Pat. No. 4,743,777 which discloses a starter/generator system including an exciter having distributed AC and DC windings both carried in exciter stator slots. Such a construction, however, exhibits substantial pole-to-pole flux leakage between adjacent slots which create the magnetic poles. When using the DC field winding in the generate mode, this flux loss can significantly degrade the efficiency of the exciter.

The present invention is intended to overcome one or more of the problems as set forth above.

SUMMARY OF THE INVENTION

In accordance with the present invention, an exciter is supplied with AC power in both a generate mode of operation and a start mode of operation.

Broadly, there is disclosed herein a starter/generator system for selectively operating a brushless synchronous machine as a motor in a start mode of operation and as generator in a generate mode of operation. The machine has a rotor carrying a field winding and a stator carrying an armature winding. The system comprises an exciter including a rotor on a common shaft with the machine rotor and carrying an AC armature winding, and a stator carrying an AC field winding. Means, typically diodes, are connected between the exciter armature winding and the machine field winding for rectifying AC power from the exciter armature winding to DC power for the machine field winding. A control includes first means for supplying power to the machine main armature winding when operating as a motor, and second means for supplying AC power to the exciter field winding when the machine is operated as both a motor and a generator.

In accordance with the invention, the disclosed dynamoelectric machine comprises an AC-AC exciter which functions as both an exciter generator and a rotary transformer. The exciter includes a conventional slotted rotor carrying a distributed three-phase armature winding. The stator is also slotted and carries a distributed three-phase field winding.

A starter/generator system also includes a main inverter and an exciter inverter. These inverters are controlled by a generator/converter control unit (GCCU) in both the generate mode and the start mode. The GCCU develops signals for driving solid state switches in the main inverter for selectively providing constant frequency power to an aircraft power bus in the generate mode and providing generator main armature power in the start mode. The drive switches for the exciter inverter are also controlled by the GCCU to develop the desired field power to the generator/motor. In the generate mode, the PMG output is connected through rectifiers to a voltage regulator. In the start mode, the aircraft bus, which is powered by an external source, is connected through the rectifier to the regulator, thus replacing the immobilized PMG. The output of the regulator comprises DC power to the exciter inverter.

In accordance with another aspect of the invention, the exciter inverter supplies relatively high frequency AC power to the exciter field winding when the machine is operated as a motor and supplies relatively low frequency power to the exciter winding when the machine is operated as a generator.

During the start mode, excitation power is provided solely from the exciter inverter. However, in the generate mode it is desirable to convert shaft mechanical power to electrical power for providing excitation. Therefore, in accordance with the disclosed system, the GCCU operates the exciter inverter at high frequency in the start mode and at low frequency in the generate mode.

In accordance with another aspect of the invention, the system is provided with the exciter inverter also connected to taps in the exciter stator winding to provide lower reactance at high frequency in the start mode.

In accordance with yet another aspect of the invention, the system includes a transformer connected between the exciter stator winding and the exciter inverter to step up the voltage in the start mode, and thus limit current in the generate mode. A transformer is used when the external source voltage is limited.

Further features and advantages of the invention will readily be apparent from the specification and from the drawings.

DESCRIPTION OF THE INVENTION

Figure 1:
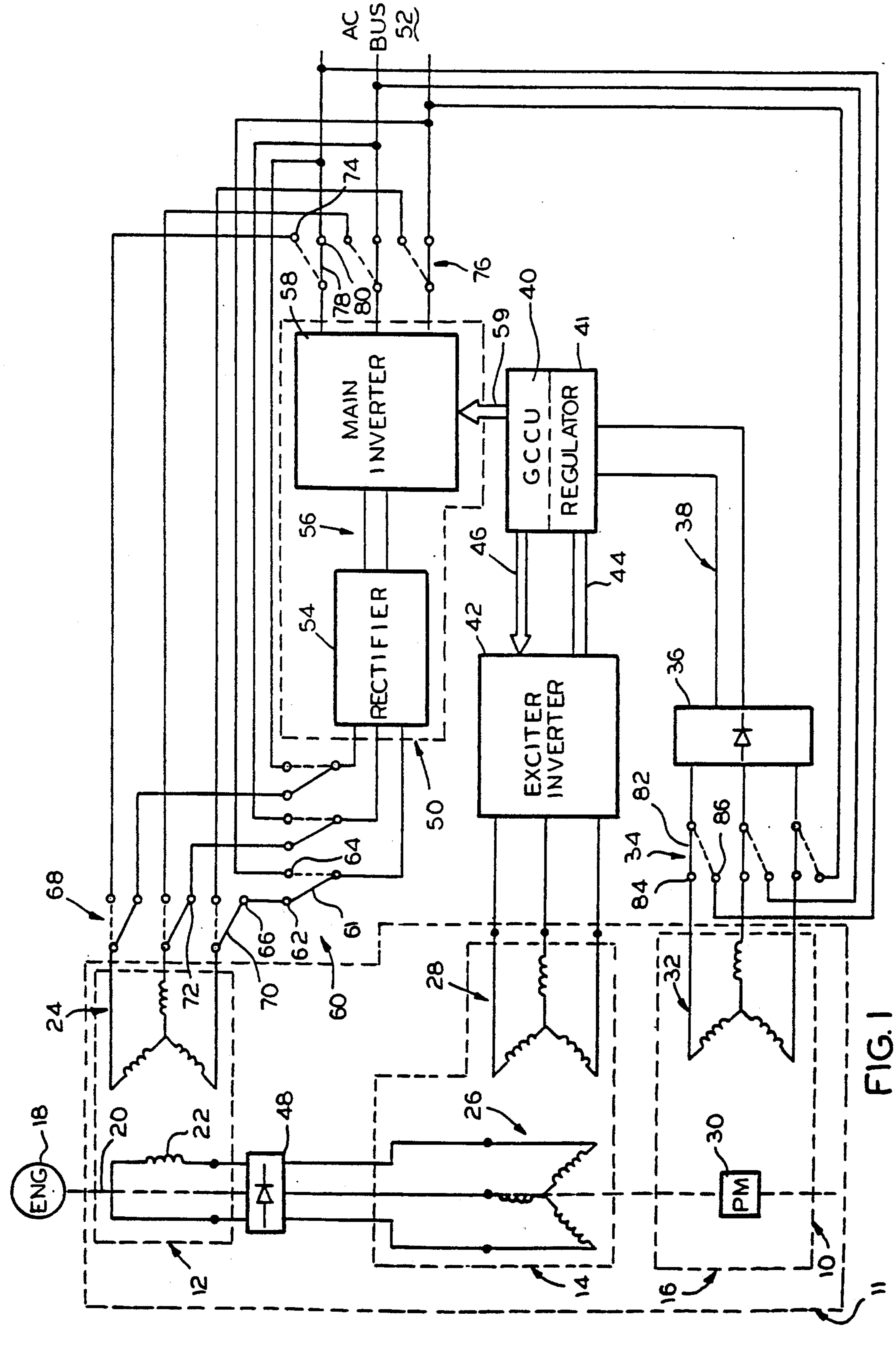
FIG. 1 is a combined schematic and block diagram of an electrical system according to the invention.

Referring first to FIG. 1, an electrical power system 10 includes a generator 11 which comprises a main generator 12, an AC exciter 14 for providing main field current to the generator 12 and a permanent magnet generator (PMG) 16. Each of the main generator 12, exciter 14 and PMG 16 include rotors driven by an engine 18 through a common shaft, represented by a line 20.

The main generator 12 includes a rotor carrying a DC field winding 22, and a stator carrying a polyphase AC armature coil or winding 24. The exciter 14 comprises an AC-AC exciter wherein a rotor carries a polyphase AC armature winding 26, and a stator carries a polyphase AC stator winding 28. Specifically, the exciter 14 includes a conventional slotted rotor carrying a distributed three-phase armature winding 26. The stator is also slotted and carries the distributed three-phase field winding 28. The PMG 16 includes a permanent magnet rotor 30 magnetically coupled with a three-phase stator armature winding 32.

The PMG stator winding 32 is connected through a first converter output relay 34 to a rectifier assembly 36. The rectifier 36 converts polyphase AC power to DC power on lines 38 to a GCCU 40 including a regulator 41. The regulator 41 regulates the level of the DC power in a conventional manner and provides DC power to an exciter inverter 42 on a line 44. The exciter inverter 42 may comprise, for example, a conventional voltage source inverter having six solid state power switches connected in a three-phase bridge configuration. The exciter inverter switches are controlled by the GCCU 40 which develops base drive signals on a line 46. The output of the exciter inverter supplies AC power to the exciter AC field winding 28.

As is conventional in brushless power generators, rotation of the shaft 20 by the engine 18 results in generation of a polyphase voltage in the exciter armature windings 26 as they traverse the magnetic field set up by the field windings 28. This polyphase voltage is rectified by a rectifier bridge, illustrated generally as a rotating rectifier assembly 48, and the rectified power is coupled to the main generator field winding 22. The current in the generator field winding 22 and the rotation of the shaft 20 sets up a rotating magnetic field in space occupied by the main generator stator windings 24. The stator windings 24 develop polyphase output power which is delivered to a converter 50 which develops constant frequency output power on an AC bus 52.

In a typical application, the engine 18 is the main engine in an aircraft, and the converter 50 is part of a variable speed constant frequency (VSCF) system for delivering constant frequency power to the AC bus 52 for powering aircraft loads (not shown), as controlled by the GCCU 40.

During engine start, the engine 18 is started using the main generator 12 operating as a motor. Particularly, the main generator 12 receives power from the converter 50 which is controlled by the GCCU 40. For ease of explanation herein, the main generator 12 is referred to as a motor when operated as such in the start mode of operation.

The converter 50 includes an AC/DC converter 54 connected to a DC/AC converter 58. The DC portion of this AC/DC/AC conversion is called a DC link 56. According to the illustrated embodiment of the invention, the AC/DC converter 54 comprises a full wave bridge rectifier circuit of conventional construction which is operable to convert three-phase AC power to DC power. The DC link 56 may include a conventional filter. The DC/AC converter 58 comprises a main inverter circuit which may be, for example, a three-phase bridge inverter, similar to the exciter inverter 42, discussed above.

The AC side of the rectifier 54 is connected to a set of movable contacts, illustrated typically at 61, of a converter input relay 60. The converter input relay 60 also includes respective first and second sets of fixed contacts 62 and 64. The second fixed contacts 64 are connected to the AC bus 52. The first set of fixed contacts 62 are connected to a first set of fixed contacts, illustrated typically at 66, of a generator relay 68. The generator relay 68 also includes a set of movable contacts, and a second set of fixed contacts, illustrated generally at 70 and 72, respectively. The movable contacts 70 are connected to the main generator 12, i.e., to the polyphase armature windings 24. The second set of fixed contacts 72 are connected to a first set of fixed contacts, illustrated typically at 74, of a second converter output relay 76. The second converter output relay 76 also includes a set of movable contacts and a second set of fixed contacts, illustrated typically at 78 and 80, respectively. The movable contacts 78 are connected to the output of the main inverter 58. The second set of fixed contacts 80 are connected to the AC bus 52.

The PMG output relay 34 also includes a set of movable contacts, a first set of fixed contacts, and a second set of fixed contacts, illustrated typically as 82, 84 and 86, respectively. The movable contacts 82 are connected to the rectifier 36. The first set of fixed contacts 84 are connected to the PMG armature winding 32. The second set of fixed contacts 86 are connected to the AC bus 52.

During engine start, i.e. when operating the main generator 12 as a motor, the relays 34, 60, 68 and 76 are operated with their associated movable contacts as shown in dashed line. Conversely, in the generate mode, i.e. when the main generator 12 is operated as a generator, each of the relays 34, 60, 68 and 76 are operated with their movable contacts as shown in solid line.

In the generate mode of operation, three-phase power developed by the main generator 12 is delivered from the armature winding 24 through the generator relay 68 and the converter input relay 60 to the rectifier 54. The rectifier 54 converts the polyphase AC power to DC power which is transferred to the main inverter 58. The main inverter 58 converts the DC power to AC power of constant frequency, as controlled by the GCCU 40. The constant frequency AC power from the main inverter 58 is delivered through the second converter output relay 76 to the AC bus 52. Field power is developed by the exciter 14 having its field winding 28 connected to and excited by the exciter inverter 42. Specifically, the PMG 16 develops polyphase output power in its armature winding 32 which is converted to DC power by the rectifier 36. The regulator 41 controls DC power on the line 44 to the exciter inverter 42, which is switched using switching signals on the line 46 from the GCCU 40. In order to convert mechanical shaft power to electrical power for main field 22 excitation, it is essential that as great a difference as possible exist between the mechanical rotation of the exciter rotor 26 and the phase rotation frequency in the exciter field 28. Thus, during the generate mode, the exciter inverter 42 powers the windings of the exciter field 28 with relatively low frequency ($\approx$10 Hz).

In the start mode of operation, the AC bus is connected to an available power source. Such an available power source may comprise an external ground power unit which provides 120/208 volts, 400 hertz, three-phase, AC power. The AC power is delivered to the rectifier assembly 36 through the first converter output relay 34 for providing DC power to the regulator 41 and thus exciter inverter 42. High frequency switching of the exciter inverter 42 is controlled by the GCCU 40 to operate the exciter 14 as a rotary transformer for developing field power. The AC power from the bus 52 is also delivered through the converter input relay 60 to the rectifier assembly 54. The AC voltage is then rectified and transferred through the DC link 56 to the main inverter 58 where it is converted to varying frequency AC power. The AC power from the main inverter 58 is delivered through the second converter output relay 76 and the generator relay 68 to the main generator armature windings 24. The field power developed in the field winding 22 from the exciter 14 coacts with the varying frequency polyphase power in the armature winding 24 to provide motoring action which causes the shaft 20 to rotate. The start mode of operation is implemented until the engine speed is sufficient, at which time control may switch to the generate mode.

In the start mode it is necessary to operate the exciter 14 as a rotary transformer using high frequency AC power. Electric power is transferred across the air gap from the field winding 28 to the armature winding 26 using transformer action flux linkage. At standstill, all the power required by the generator field winding 22 in addition to losses must be supplied from the AC exciter field winding 28. The supply phase sequence is oriented counter to the rotor direction of rotation so that the effective frequency seen in the exciter armature winding 26 increases and doubles by the time the rotor obtains a speed equivalent to the frequency of the stator. This reduces the iron required in the various components.

In the generate mode of operation, it is undesirable to use DC power to the exciter AC field winding 28 because only two-thirds of the windings would be utilized. This would result, in effect, in a waste of copper in a generate mode, and hot spots would result since only two-thirds of the device would be utilized in the generate mode of operation. Alternatively, to use all three windings in connection with DC power would require reconfiguration of the windings 28 and suitable switching devices which would increase size, weight and complexity.

Alternatively, high frequency AC power could be supplied to the exciter field winding 28 in the generate mode. However, this would result in all power being supplied electrically. Instead, it is desirable to use the shaft power as much as possible in the generate mode of operation, since the engine is rotating the shaft 20.

Therefore, in accordance with the invention, the exciter inverter 42 is operated to supply high frequency power to the exciter field 28 in the start mode, and low frequency AC power to the exciter field 28 in the generate mode. The use of low frequency AC power in the generate mode avoids hot spots, the waste of copper, extra weight and size and reconfiguration of the field winding 28. This approaches DC excitation where near maximum mechanical power is taken from the shaft 20.

Figure 2:
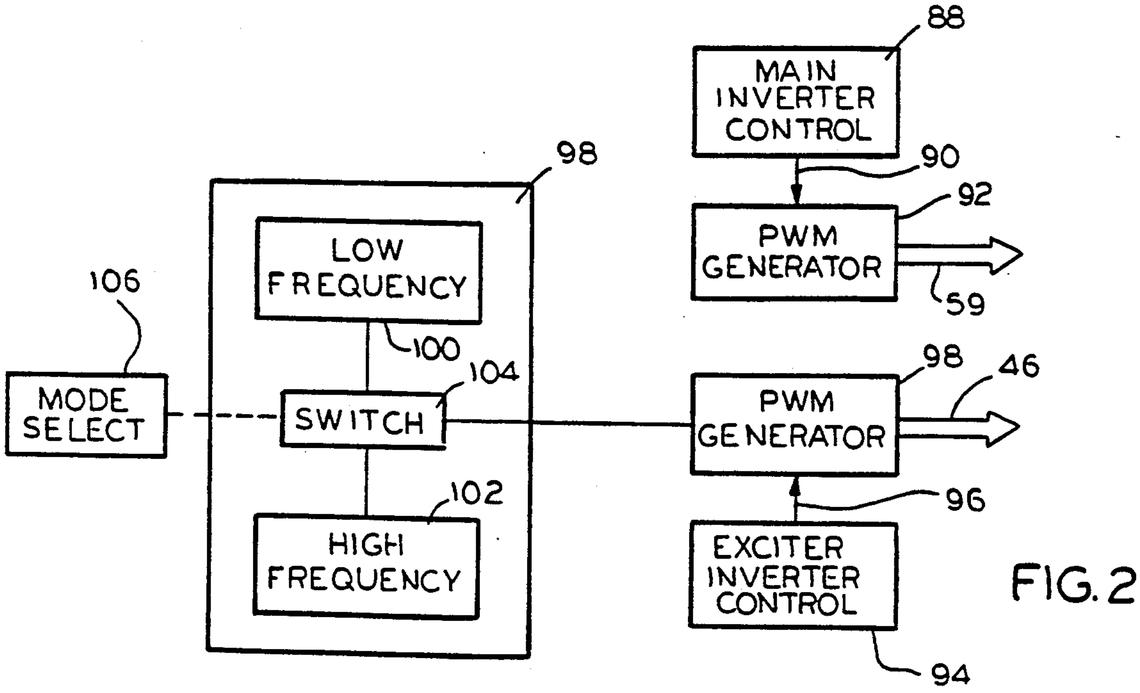
FIG. 2 is a block diagram of the generator converter control unit of FIG. 1.

With reference to FIG. 2, a block diagram illustrates an implementation for the GCCU 40 according to the invention.

A main inverter control 88 develops a suitable control signal on a line 90 coupled to a pulse width modulation (PWM) generator 92. The PWM generator 92 develops the base drive commands which are transferred on a line 59 to the main inverter 58, see FIG. 1. The PWM generator 92 may be of any conventional construction which does not form part of the present invention.

An exciter inverter control 94 develops a command signal on a line 96 for controlling a second PWM generator 98. The second PWM generator 98 develops base drive commands on the line 46 to the exciter inverter 42, see FIG. 1. The exciter inverter control 94 controls the PWM generator 98, as desired, to control the duty cycle of the PWM signals. The frequency of the PWM signals are controlled in accordance with a clock circuit 98. The clock circuit 98 includes a low frequency oscillator 100 and a high frequency oscillator 102, each connected through a switch 104 to the PWM generator 98. The switch 104 is operated by a mode select 106. Specifically, in the generate mode of operation, the mode select 106 operates the switch 104 to connect the low frequency oscillator 100 to the PWM generator 98. Conversely, in the start mode of operation, the mode select 106 operates the switch 104 to connect the high frequency oscillator 102 to the PWM generator 98. Thus, the exciter inverter 42 is operated at relatively low frequency, for example 10 hertz, in a generate mode of operation and at high frequency, for example 1200 hertz, in the start mode of operation.

In the start mode of operation, the output of the permanent magnet generator 16 is disconnected. If a 120 volt external ground power unit is available, then, due to line drops, a lower level of voltage, e.g. 95 volts, may be available at the exciter inverter 42. The exciter 14 should then be sized to start at, for example, 90 volts. Therefore, the exciter field winding 28 must have fewer turns to provide low voltage starting. This provides lower inductance and lower reactance at high frequencies. In such an application, it is necessary to limit current in the generate mode of operation since current will be higher with the lesser number of turns.

Figure 3:
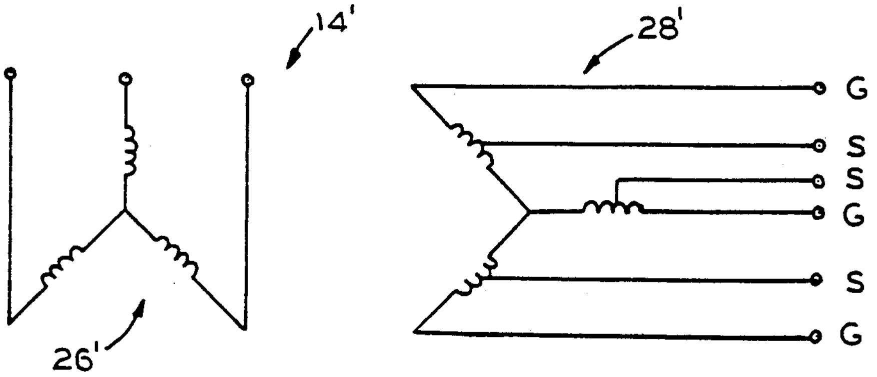
FIG. 3 is a schematic diagram of an exciter according to an alternative embodiment of the invention.

With reference to FIG. 3, an exciter 14' according to an alternative embodiment of the invention is illustrated. The exciter 14' includes a polyphase rotor armature winding 26' and a polyphase AC stator field winding 28'. The field winding 28' includes a select number of turns which ar sufficient to provide self limiting in the generate mode of operation. Specifically, in the generate mode of operation, the exciter inverter 42, see FIG. 1, is connected to the field winding 28' utilizing the terminals labelled G. However, the terminals labelled S, which are used in the start mode, tap off of the stator windings 28'. Specifically, the terminals S, which are also connected to the exciter inverter 42, are connected so that fewer turns are utilized to provide lower reactance at high frequency. Although not shown, suitable switching may be provided between the stator winding terminals S and G and the exciter inverter 42 for use in the start mode and the generate mode, respectively.

Figure 4:
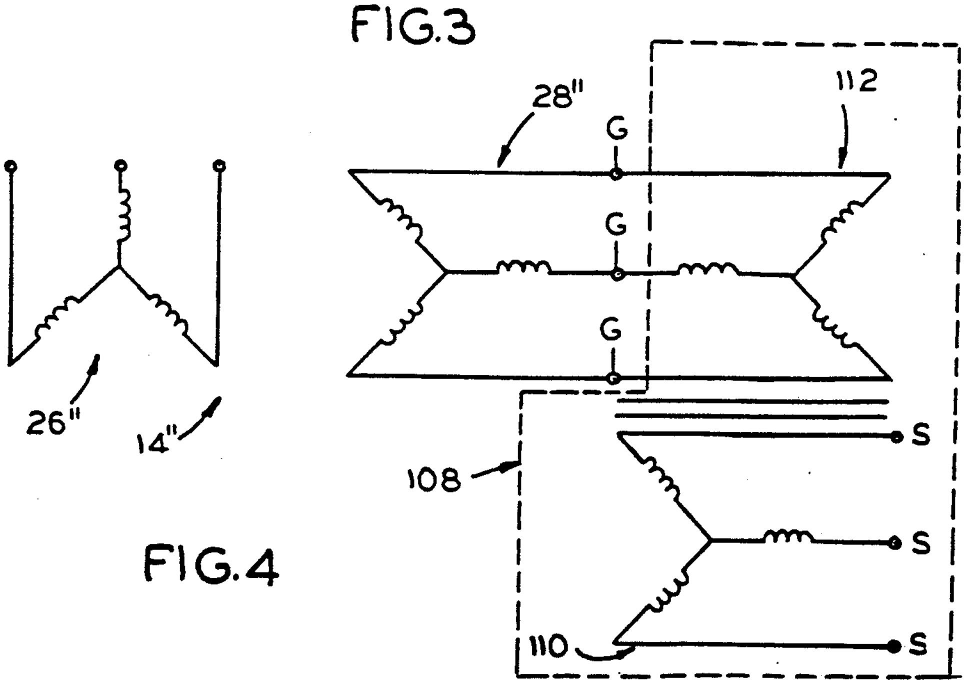
FIG. 4 is a schematic diagram of an exciter and transformer according to yet another embodiment of the invention.

Referring to FIG. 4, a second alternative is illustrated and comprises an exciter 14". The exciter 14" includes a polyphase motor armature winding 26", and a polyphase stator field winding 28". The stator windings 28" are connected to terminals labelled G which are connected directly to the exciter inverter 42, see FIG. 1, when operating in the generate mode of operation. The terminals labelled G are also connected to a transformer 108 having a polyphase primary 110 ending into terminals S, and a polyphase secondary 112 connected to the stator winding 28". The terminals labelled S are also connected to the exciter inverter 42, see FIG. 1, for use in the start mode of operation. Specifically, in the generate mode of operation, the exciter 14" operates much the same as the exciter 14, see FIG. 1. The transformer 108 is used in the start mode to step up the voltage from the exciter inverter 42. Since the AC frequency during startup is high, the resulting added transformer 108 is quite small and the added size and weight is therefore minimized.

The GCCU and regulator 40 described herein can be implemented with suitable electrical or electronic circuits, or with a software program control, as is obvious to those skilled in the art.

Thus, the invention broadly comprehends a starter/-generator system which utilizes an AC-AC exciter for providing field power to the main generator/motor. The AC-AC exciter is operated at low frequency in the generate mode of operation and high frequency in the start mode operation to minimize size and weight requirements and to provide efficient operation in both the start mode and the generate mode.

We claim:

1. A starter/generator system for selectively operating a brushless synchronous machine as a motor in a start mode of operation and as a generator in a generate mode of operation, the machine having a rotor carrying a main field winding and a stator carrying a main armature winding, the system comprising:

an exciter including a rotor on a common shaft with the machine rotor and carrying an AC armature winding, and a stator carrying an AC field winding;

means connected between said exciter armature winding and said machine field winding for rectifying AC power from said exciter armature winding to DC power for said machine field winding; and a control including first means for supplying power to said machine armature winding when operating as a motor, and second means for supplying AC power to said exciter field winding when said machine is operated as both a motor and a generator.

2. The system of claim 1 wherein said second supplying means supplies relatively high frequency AC power to said exciter field winding when said machine is operated as a motor and supplies relatively low frequency power to said exciter winding when said machine is operated as a generator.

3. The system of claim 1 wherein said second supplying means comprises an inverter.

4. The system of claim 1 wherein said first supplying means comprises an inverter, and further, comprising means for controlling said inverter to convert power developed by said machine when operated as a generator to constant frequency power.

5. The system of claim 1 wherein said exciter field winding includes a select plurality of turns and said second supplying means supplies power to less than all of said plurality of turns when said machine is operated as a motor.

6. The system of claim 1 further comprising a transformer coupled to said exciter field winging and wherein said second supplying means supplies power to said exciter field winding through said transformer when said machine is operated as a motor.

7. A starter/generator system for selectively operating a brushless synchronous generator as a motor in a start mode of operation and as a generator in a generate mode of operation, the machine having a rotor carrying a main DC field winding and a stator carrying a main polyphase armature winding, the system comprising:

an exciter including a rotor on a common shaft with the machine rotor and carrying an AC armature winding, and a stator carrying an AC field winding;

a rectifier assembly connected between said exciter armature AC winding and said machine field winding for rectifying AC power from said exciter armature winding to DC power for said machine field winding; and a control including a main inverter for supplying polyphase power to said machine main armature winding in the start mode of operation, an exciter inverter coupled to said exciter AC field winding and control means for controllably switching said exciter inverter to supply relatively high frequency AC power to said exciter field winding in the start mode and to supply relatively low frequency power to said exciter winding in the generate mode.

8. The system of claim 7 further comprising means for controlling said main inverter to convert power developed by said machine armature winding in the generate mode of operation to constant frequency power.

9. The system of claim 7 wherein said exciter field winding includes a select plurality of turns and said second supplying means supplies power to less than all of said plurality of turns in the start mode.

10. The system of claim 7 further comprising a transformer coupled to said exciter field winding and wherein said second supplying means supplies power to said exciter field winding through said transformer in the start mode.

* * * * *